US009589257B2

(12) United States Patent
Bauer Marshall et al.

(10) Patent No.: US 9,589,257 B2
(45) Date of Patent: Mar. 7, 2017

(54) ELECTRONIC AUTHORIZATION SYSTEM AND METHOD

(71) Applicant: MERCHANT LINK, LLC, Silver Spring, MD (US)

(72) Inventors: Stephanie Bauer Marshall, Arlington, VA (US); Jonathan N. Freedman, Chevy Chase, MD (US); Daniel J. Lane, North Potomac, MD (US); Miriam Jaffe, Columbia, MD (US); Susan M. Zloth, Castle Rock, CO (US)

(73) Assignee: MERCHANT LINK, LLC, Silver Spring, MD (US)

( * ) Notice: Subject to any disclaimer, the term of this patent is extended or adjusted under 35 U.S.C. 154(b) by 0 days.

(21) Appl. No.: 14/276,916

(22) Filed: May 13, 2014

(65) Prior Publication Data
US 2014/0249940 A1  Sep. 4, 2014

Related U.S. Application Data

(60) Division of application No. 13/859,724, filed on Apr. 9, 2013, now Pat. No. 8,726,018, which is a division
(Continued)

(51) Int. Cl.
*G06F 21/62* (2013.01)
*G06Q 20/20* (2012.01)
(Continued)

(52) U.S. Cl.
CPC ............ *G06Q 20/20* (2013.01); *G06F 21/54* (2013.01); *G06F 21/6227* (2013.01);
(Continued)

(58) Field of Classification Search
CPC .... G06F 21/62; G06F 21/606; G06F 21/6218; G06F 21/6227; G06F 21/6245; G06F 21/6254; G06F 21/6263
See application file for complete search history.

(56) References Cited

U.S. PATENT DOCUMENTS 5,978,918 A  11/1999  Scholnick et al.
6,332,193 B1  12/2001  Glass et al.
(Continued)

OTHER PUBLICATIONS

Shift4 Releases New Technology to Insure the Security of its Merchants' and Partners' Payment Processing, Tokenization Moves the Liability for Securing Credit Card Data Away from Merchants' and POS Application Developers, Las Vegas, Nevada, Oct. 5, 2005, 2 pgs.
(Continued)

*Primary Examiner* — David Pearson
(74) *Attorney, Agent, or Firm* — Jackson Walker LLP; Christopher J. Rourk

(57) ABSTRACT

An electronic authorization system comprising a data source system configured to transmit transaction data. A secure data system is coupled to the data source system over an open network, the secure data system is configured to receive the transaction data from the data source system, generate a unique encrypted identifier for the transaction data and to transmit the unique encrypted identifier to the data source system. The data source system is configured to receive the unique encrypted identifier and replace payment card data associated with the transaction data in a database with the unique encrypted identifier.

19 Claims, 2 Drawing Sheets

Related U.S. Application Data of application No. 13/221,719, filed on Aug. 30, 2011, now Pat. No. 8,417,947, which is a division of application No. 12/250,336, filed on Oct. 13, 2008, now Pat. No. 8,010,791, which is a continuation of application No. 11/366,189, filed on Mar. 2, 2006, now Pat. No. 7,451,481.

(60) Provisional application No. 60/676,681, filed on Apr. 29, 2005.

(51) Int. Cl.
G06Q 20/38 (2012.01)
G06Q 20/40 (2012.01)
G06F 21/54 (2013.01)

(52) U.S. Cl.
CPC ....... *G06F 21/6254* (2013.01); *G06Q 20/382* (2013.01); *G06Q 20/385* (2013.01); *G06Q 20/401* (2013.01); *G06F 2221/2107* (2013.01)

(56) References Cited

U.S. PATENT DOCUMENTS

| | | |
|---|---|---|
| 6,938,019 B1 | 8/2005 | Uzo |
| 6,938,022 B1 | 8/2005 | Singhal |
| 6,990,470 B2 | 1/2006 | Hogan et al. |
| 7,082,415 B1 | 7/2006 | Robinson et al. |
| 7,376,629 B1 | 5/2008 | McIsaac et al. |
| 7,512,236 B1 | 3/2009 | Zhu |
| 2002/0007320 A1 | 1/2002 | Hogan et al. |
| 2002/0022967 A1 | 2/2002 | Ohkado |
| 2002/0133467 A1 | 9/2002 | Hobson et al. |
| 2002/0191020 A1 | 12/2002 | Kaply et al. |
| 2003/0046237 A1 | 3/2003 | Uberti |
| 2003/0061171 A1 | 3/2003 | Gilbert et al. |
| 2004/0073688 A1 | 4/2004 | Sampson |
| 2004/0172309 A1 | 9/2004 | Selwanes et al. |
| 2004/0210449 A1 | 10/2004 | Breck et al. |
| 2005/0198111 A1 | 9/2005 | Lamb et al. |

OTHER PUBLICATIONS

Mark, Heather, Storing Credit Card Data, A Look at the Business Needs, Regulations and Solutions Surrounding the Issue, CISSP, Jan. 2006, 44 pgs.

Letter from Michael J. Andelson of Best Best & Krieger LLP to Christopher Justice, President, Merchant Link, LLC and Michael P. Duffy, Chief Executive Officer of Chase Paymentech Solutions, LLC, dated Dec. 14, 2006, 4 pgs.

United States Patent and Trademark Office, International Search Report and Written Opinion, PCT Application No. PCT/US2006/016745, Jun. 18, 2007, 8 pgs.

Canadian Patent Office, Office Action, Patent Application No. 2,606,183, Jan. 28, 2011, 4 pgs.

ELECTRONIC AUTHORIZATION SYSTEM AND METHOD

CROSS-REFERENCE TO RELATED APPLICATION

This patent application is a divisional of U.S. patent application Ser. No. 13/859,724, filed Apr. 9, 2013, now U.S. Pat. No. 8,726,018; which is a divisional of U.S. patent application Ser. No. 13/221,719, filed Aug. 30, 2011, now U.S. Pat. No. 8,417,947; which is a divisional of U.S. patent application Ser. No. 12/250,336, filed Oct. 13, 2008, now U.S. Pat. No. 8,010,791; which is a continuation of U.S. patent application Ser. No. 11/366,189, filed Mar. 2, 2006, now U.S. Pat. No. 7,451,481; which claims priority to U.S. Provisional Application Ser. No. 60/676,681, filed Apr. 29, 2005, all of which are hereby incorporated by reference for all purposes.

FIELD OF THE INVENTION

The present invention pertains to the field of database systems, and more particularly to a database system and method for encryption and protection of confidential information that uses a unique surrogate identifier for confidential information that is stored on devices that are accessible over an open network.

BACKGROUND OF THE INVENTION

Data communications channels such as computer networks have varying degrees of security. Some computer networks, such as the Internet, are open to a large number of users. Computers that are connected to these networks may be subject to attack from third parties that want access to confidential information that is stored on the computers. This problem can be exacerbated when the confidential information is third party confidential information that is only used for short periods of time and which is then stored for future use, such as personnel data, medical data, business data, financial data, or other data.

Although firewalls and other security devices can be used to provide some protection, active monitoring of network state and data flows is required to provide the highest level of security. However, most businesses cannot afford to provide such high levels of security.

SUMMARY OF THE INVENTION

In accordance with the present invention, an electronic authorization system is provided that overcomes known problems with encryption and protection of confidential data.

In particular, an electronic authorization system is provided that does not require confidential data to be stored in a manner where it is accessible over an open network.

In accordance with an exemplary embodiment of the present invention, an electronic authorization system comprising a data source system configured to transmit transaction data. A secure data system is coupled to the data source system over an open network, the secure data system is configured to receive the transaction data from the data source system, generate a unique encrypted identifier for the transaction data and to transmit the unique encrypted identifier to the data source system. The data source system is configured to receive the unique encrypted identifier and replace payment card data associated with the transaction data in a database with the unique encrypted identifier.

The present invention provides many important technical advantages. One important technical advantage of the present invention is a system and method for managing merchant payment transaction processing accounts that allows a user to obtain pricing information without giving the user access to proprietary information, such as tiered pricing structures that are developed using knowledge that has been accumulated for classes of merchants.

Those skilled in the art will further appreciate the advantages and superior features of the invention together with other important aspects thereof on reading the detailed description that follows in conjunction with the drawings.

DETAILED DESCRIPTION OF PREFERRED EMBODIMENTS

Figure 1:
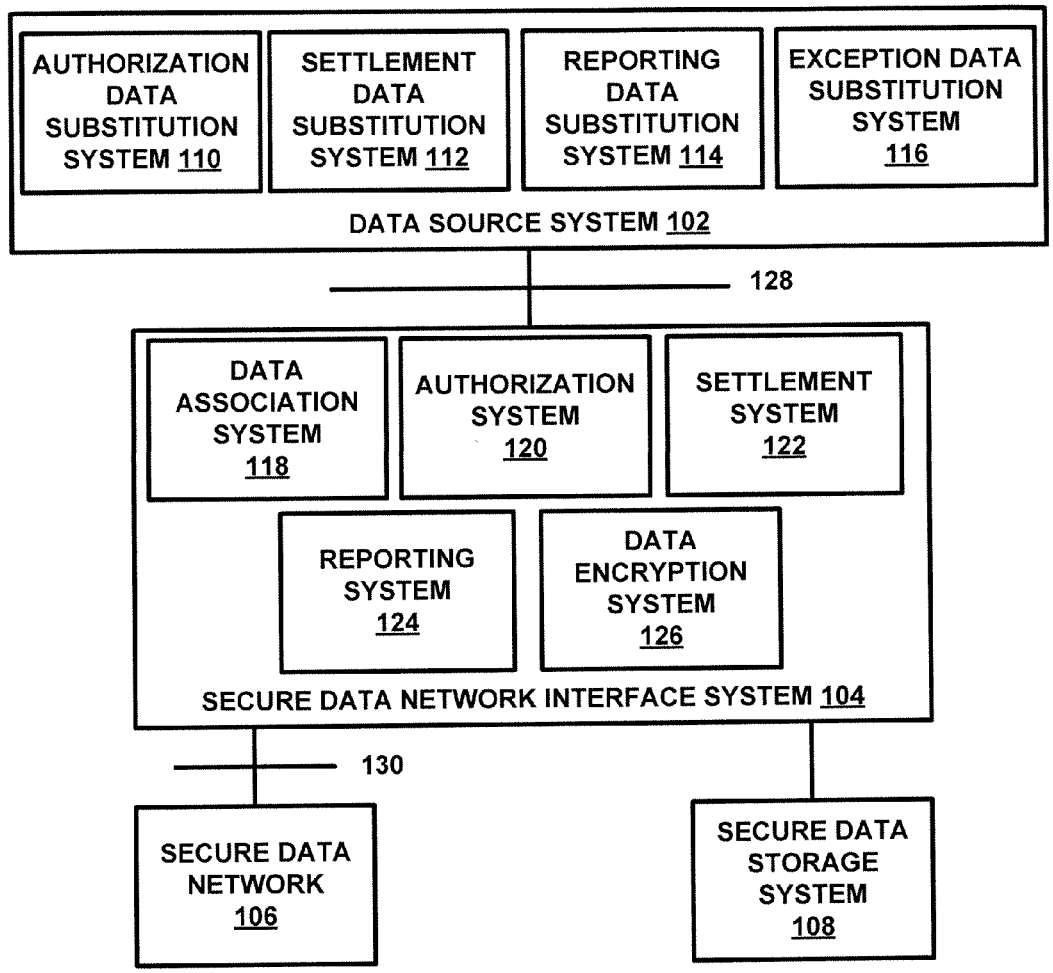
FIG. 1 is a diagram of a database system for encryption and protection of confidential data in accordance with an exemplary embodiment of the present invention.

In the description that follows, like parts are marked throughout the specification and drawings with the same reference numerals, respectively. The drawing figures might not be to scale, and certain components can be shown in generalized or schematic form and identified by commercial designations in the interest of clarity and conciseness.

FIG. 1 is a diagram of a database system 100 for encryption and protection of confidential data in accordance with an exemplary embodiment of the present invention. System 100 allows a computer on an open network to perform functions with confidential information without requiring that computer to store the confidential information so as to protect the confidential information from misappropriation.

Database system 100 includes data source system 102, secure data network interface system 104, secure data network 106 and secure data storage system 108, each of which can be implemented in hardware, software, or a suitable combination of hardware and software, and which can be one more software systems operating on a suitable processing platform. As used herein, a hardware system can include a suitable general purpose processor, an application specific integrated circuit, a field programmable gate array, or other suitable systems. A software system can include one or more objects, agents, threads, lines of code, subroutines, separate software applications, two or more lines of code or other suitable software structures operating in two or more software applications or on two or more processors, or other suitable software structures. In one exemplary embodiment, a software system can include one or more lines of code or other suitable software structures operating in a general purpose software application, such as an operating system, and one or more lines of code or other suitable software structures operating in a specific purpose software application.

Data source system 102 receives confidential data Ci and first associated data Da1. Confidential data Ci can be confidential business data, personal data, financial data, technical data, or other suitable data. First associated data Da1 can be non-confidential data that is associated with the confidential data, such as a file structure that has had all confidential data removed, a record identifier, a transaction identifier, or other suitable data. Confidential data Ci and first associated data Da1 is then provided to secure data network 106 through secure data network interface system 104, and first associated data Da1, unique encrypted identifier E1, second associated data Da2 without confidential data Ci is received in response. Data source system 102 stores first associated data Da1, unique encrypted identifier E1, second associated data Da2 without confidential data Ci, so as to prevent unwanted access to confidential data Ci at data source system 102 over open network 128. In one exemplary embodiment, data source system 102 stores the unique encrypted identifier Ei until a predetermined period of time has elapsed.

In another exemplary embodiment, data source system 102 requests additional data DaN from secure data network 106 through secure data network interface system 104 using the unique encrypted identifier Ei, and secure data network interface system 104 translates unique encrypted identifier Ei to confidential information Ci for transmission over secure data network 106. This request can be made by sending a structured request that contains only that information, a sequence of messages with that information, fields within an existing data format (such as the VISAD data format with that information, encrypted or unencrypted, or in other suitable manners. In one exemplary embodiment, secure data network interface system 104 translates confidential information Ci using unique encrypted identifier Ei to transmit the additional data DaN to data source system 102 over open network 128. In this exemplary embodiment, data fields in a pre-existing or proprietary data format that are blank, filler fields, or unassigned can be used to indicate that the message contains a request to translate Ei to Ci, so as to allow systems that are configured to process the pre-existing or proprietary data formats to also process the translation requests. Data source system 102 can also store the unique encrypted identifier Ei until a predetermined period of time has elapsed, until a predetermined period of time has elapsed after additional data DaN is received from secure data network 108.

Settlement data substitution system 112 transmits a settlement request Sr and unique encrypted identifier Ei to secure data network interface system 104 and receiving a settlement confirmation Sc and unique encrypted identifier Ei from secure data network interface system 104. This request can be made by sending a structured request that contains only that information, a sequence of messages with that information, fields within an existing data format (such as the VISAD data format or a proprietary data format) with that information, encrypted or unencrypted, or in other suitable manners. Data fields in a pre-existing or proprietary data format that are blank, filler fields, or unassigned can be used to indicate that the message contains Sr and Ei or to receive Sc and Ei, so as to allow systems that are configured to process the pre-existing or proprietary data formats to also process the settlement requests.

Reporting data substitution system 114 allows reporting data to be generated using unique encrypted identifier Ei. In one exemplary embodiment, data source system 102 provide unique encrypted identifier Ei to secure data network interface system 104 with report request Rr, and secure data network interface system 104 and secure data network 106 generate a report based on unique encrypted identifier Ei and report request Rr. This request can be made by sending a structured request that contains only that information, a sequence of messages with that information, fields within an existing data format (such as the VISAD data format or a proprietary data format) with that information, encrypted or unencrypted, or in other suitable manners. Data fields in a pre-existing or proprietary data format that are blank, filler fields, or unassigned can be used to indicate that the message contains Rr and Ei or to receive the report, so as to allow systems that are configured to process the pre-existing or proprietary data formats to also process the settlement requests.

Exception data substitution system 116 receives exception data Dd and unique encrypted identifier Ei from secure data network interface system 104 and transmits exception response data Dr to secure data network interface system 104 in response to exception data Dd. Exception data substitution system 116 receives a transaction identifier Ti, exception category data Dc and the unique encrypted identifier Ei from secure data network interface system 104 and transmits biometric data Ed to secure data network interface system 104 in response to the transaction identifier Ti, the exception category data Dc and the unique encrypted identifier Ei. This request can be made by sending a structured request that contains only that information, a sequence of messages with that information, fields within an existing data format (such as the VISAD data format or a proprietary data format) with that information, encrypted or unencrypted, or in other suitable manners. Data fields in a pre-existing or proprietary data format that are blank, filler fields, or unassigned can be used to indicate that the message contains Dr or Ed and to receive Dc, so as to allow systems that are configured to process the pre-existing or proprietary data formats to also process the settlement requests.

Secure data network interface system 104 receives confidential data Ci and first associated data Da1 from data source system 102, stores confidential data Ci and first associated data Da1 in secure data storage system 108, and interfaces with systems over secure data network 106 to obtain second associated data Da2. In one exemplary embodiment, secure data network interface system 104 can access frame relay connections, dedicated communications lines, or other secure data communications media to obtain second associated data Da2 in response to the confidential data Ci and first associated data Da1, additional data DaN in response to subsequent queries, or other suitable data. Secure data network interface system 104 provides unique encrypted identifier Ei and second associated data Da2 to data source system 102 over open network 128.

Secure data network interface system 104 includes data association system 118, authorization system 120, settlement system 122, reporting system 124 and data encryption system, each of which can be implemented in hardware, software or a suitable combination of hardware and software, and which can be one or more software systems operating on a general purpose processing platform. Secure data network interface system 104 can receive a structured request that only contains information from one or more systems of data source system 102, a sequence of messages with that information, fields within an existing data format (such as the VISAD data format or a proprietary data format) with that information, encrypted or unencrypted, or in other suitable manners. Data fields in a pre-existing or proprietary data format that are blank, filler fields, or unassigned can be used to indicate that the message contains data from one or more of the systems of data source system 102, or to transmit data to those systems, so as to allow systems that are configured to process the pre-existing or proprietary data formats to also process the settlement requests.

Data association system 118 associates the confidential data Ci with unique encrypted identifier Ei and stores confidential data E1, first associated data Da1 and unique encrypted identifier Ei in secure data storage system 108. In one exemplary embodiment, unique encrypted identifier Ei can be keyed to some or all of the data in first associated data Da1, confidential data Ci, both Ei and Ci, state data that indicates whether data has been received from data source system 102, secure data network 106, or other suitable sources, or other suitable data. Data association system 118 also receives second associated data Da2, associates second associated data Da2 with confidential data Ci, first associated data Da1 and unique encrypted identifier Ei, and stores confidential data Ci, first associated data Da1 and unique encrypted identifier Ei in secure data storage system 108.

Authorization system 120 performs authorization using the confidential information Ci and the first associated data Da1. In one exemplary embodiment, authorization system 120 can send an authorization request Ar to secure data network 106, and can receive an authorization indicator Ai that identifies whether authorization was approved or denied, the reason why authorization was denied, a request for additional information, or other suitable data.

Settlement system 122 performs settlement using the confidential information Ci and the first associated data Da1. In one exemplary embodiment, settlement system 122 can send a settlement request Sr to secure data network 106, and can receive settlement data Sd that identifies whether settlement was processed or denied, the reason why settlement was denied, a request for additional information, or other suitable data.

Reporting system 124 provides reporting functions using unique encrypted identifier Ei, confidential data Ci, first associated data Da1, second associated data Da2, additional data DaN, or other suitable data. In one exemplary embodiment, reporting system 124 can receive a plurality of unique encrypted identifiers and can obtain the corresponding confidential data Ci, first associated data Da1, second associated data Da2, authorization request Ar, authorization indicator Ai, settlement request Sr, settlement data Sd, or other suitable data, and can generate reports based on the types of data specified, available data, or other suitable data.

Data encryption system 126 generates a unique encrypted identifier Ei for confidential data Ci. In one exemplary embodiment, the unique encrypted identifier Ei can have the same data format as the confidential information, so as to allow the data source system to operate without modification. In this exemplary embodiment, the data source system can store the unique encrypted identifier Ei as if it were the unencrypted confidential information, so as to allow the use of the unique encrypted identifier Ei to be seamlessly transparent to the user of data source system 102. Likewise, suitable systems can be used to interface with existing systems of data source system 102 so as to locally translate the unique encrypted identifier Ei, to modify the systems of data source system 102 to accept a unique encrypted identifier Ei that has a different size or data structure than the confidential data Ci, or to perform other suitable functions.

Secure data storage system 108 is coupled to secure data network interface system 104, and is isolated from open network 128. In one exemplary embodiment, secure data storage system 108 can be isolated from secure data network interface system 104 by a dedicated communications medium, one or more firewalls, and can have other suitable security measures, such as active monitoring for security threats. As such, the level of security that can be provided using secure data storage system 108 is much greater than is typically provided for data source system 102.

Secure data network 106 is coupled to secure data network interface system 104, receives the confidential data Ci and the first associated data Da1, and generates second associated data Da2. Secure data network 106 provides second associated data Da2 to secure data network interface system 104.

In operation, database system 100 allows confidential information Ci to be used over an open network without the need to store the confidential information in a data storage device that is accessible over the open network. In this manner, data source systems can receive confidential medical data, financial data, personal data, or other suitable data and can perform a variety of functions using the confidential data without the need to store the confidential data or otherwise incur costs for protecting the confidential data from third parties.

Figure 2:
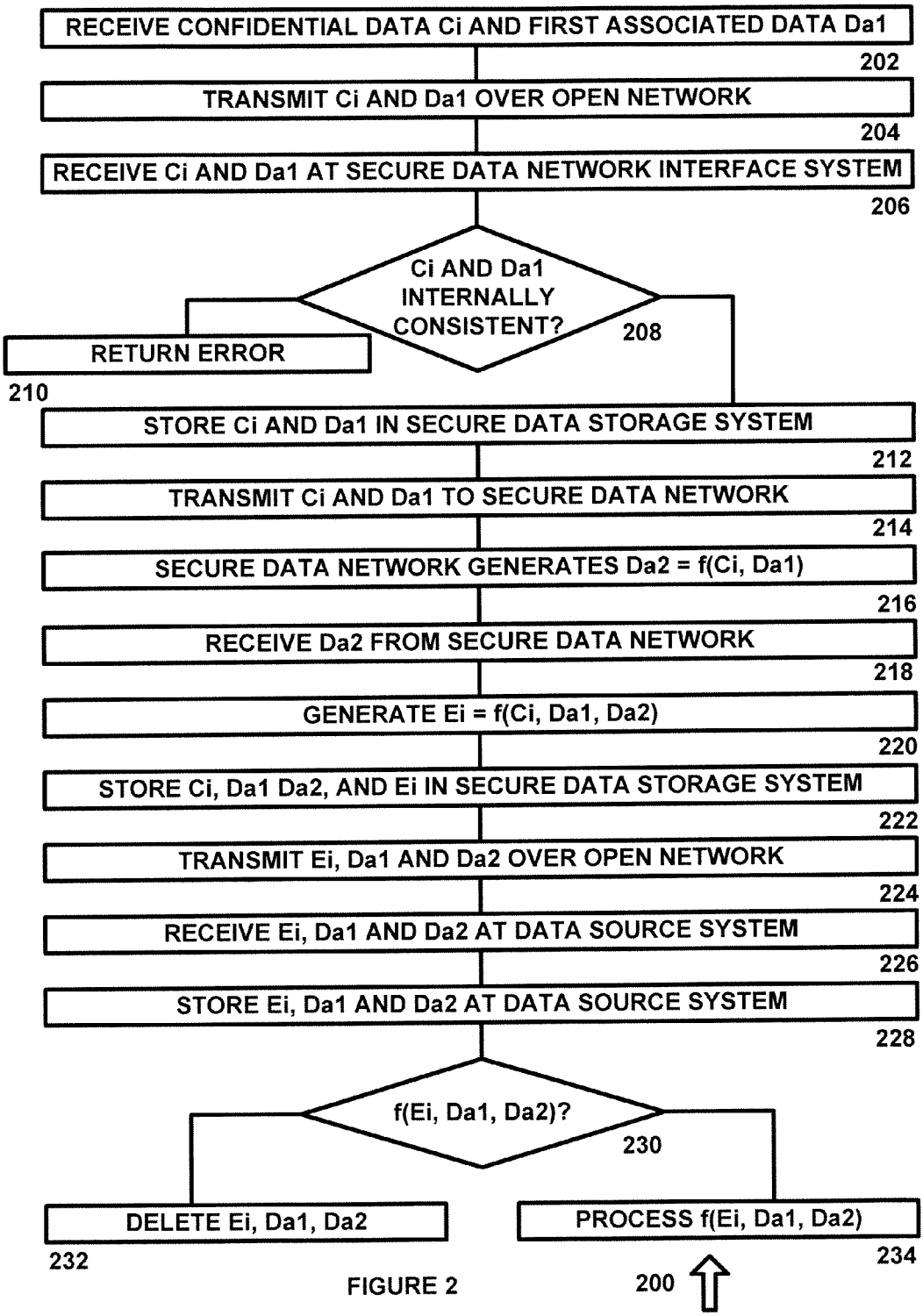
FIG. 2 is a flow chart of a method for encryption and protection of confidential data.

FIG. 2 is a flow chart of a method 200 for encryption and protection of confidential data. Method 200 begins at 202 where confidential data Ci and first associated data Da1 is received, such as at a data source system. The method then proceeds to 204 where the confidential data Ci and the first associated data Da1 is transmitted from the data source system over an open network to a data network interface system. The method then proceeds to 206.

At 206, confidential data Ci and first associated data Da1 is received at a secure data network interface system, and it is determined at 208 whether Ci and Da1 are internally consistent. In one exemplary embodiment, confidential data Ci and first associated data Da1 can have a predetermined structure with alpha and numeric fields, predetermined field values, address data, or other suitable data, and it can be determined whether the data is internally consistent. If the data is not internally consistent, the method proceeds to 210 and an error is returned. Otherwise, the method proceeds to 212 where Ci and Da1 are stored in a secure data storage system that is coupled to the data network interface system and isolated from the open network. The method then proceeds to 214.

At 214, confidential data Ci and first associated data Da1 is transmitted to a secure data network. At 216, second associated data Da2 is generated at the secure data network in response to confidential data Ci and first associated data Da1. In exemplary embodiments, second associated data Da2 can be medical claim data, financial data, credit card authorization data, funds transfer data, national security data, crime enforcement data, or other suitable data. The method then proceeds to 218 where the second associated data Da2 is received from the secure data network at the secure data network interface system. At 220, unique encrypted identifier Ei is generated, such as based on confidential data Ci, first associated data Da1 and second associated data Da2, or other suitable data. In exemplary embodiments, the format of the unique encrypted identifier Ei can be the same as the format of the confidential data Ci, the content of the data fields of Ei can be generated from the content of Da1 and Da2, or other suitable processes can be used. The method then proceeds to 22.

At 222, second associated data Da2 is associated with the confidential data Ci, the first associated data Da1, and the unique encrypted identifier Ei at the secure data network interface system. The confidential data Ci, first associated data Da1, second associated data Da2, and the unique encrypted identifier Ei can be stored in the secure data storage system. The method then proceeds to 224.

At 224, unique encrypted identifier Ei and second associated data Da2 is transmitted to the data source system over the open network, and Ei, Da1, Da2 and other suitable data is stored at the data source system, without the confidential data, so as to prevent unwanted access to the confidential data at the data source system over the open network. The method then proceeds to 230.

At 230, it is determined whether additional data has been requested from the secure data network through the secure data network interface system using the unique encrypted identifier Ei. If it is determined that a predetermined period of time has elapsed since the unique encrypted identifier Ei has been received without a suitable function being implemented, then the method proceeds to 232 where the data is deleted. Otherwise, a suitable function is performed. For example, unique encrypted identifier Ei and other suitable data can be transmitted to the secure data network interface system for transmission over the secure data network, the confidential information can be translated to the unique identifier to transmit the additional data to the data source system over the open network. A settlement request can be transmitted with the unique identifier to the secure data network interface system, and a settlement confirmation and the unique identifier can be received from the secure data network interface system. Exception data and unique encrypted identifier can also be received from the secure data network interface system and exception response data can be transmitted to the secure data network interface system in response to the exception data. A transaction identifier, exception category data and the unique identifier can also be received from the secure data network interface system and biometric data can be transmitted to the secure data network interface system in response to the transaction identifier, the exception category data and the unique identifier.

Although exemplary embodiments of a system and method of the present invention have been described in detail herein, those skilled in the art will also recognize that various substitutions and modifications can be made to the systems and methods without departing from the scope and spirit of the appended claims.

What is claimed is:

1. A method for securing payment transactions comprising:
   capturing payment data at a data source system using one or more integrated circuits, the payment data comprising card data from a payment card and confidential data;
   generating, using one or more integrated circuits, substitute payment data remote from the data source system as a function of the card data and confidential data; and
   providing the substitute payment data to a data network interface system using one or more integrated circuits, thereby causing the data network interface system to use the substitute payment data in place of the card data when sending an authorization response, said substitute payment data not being valid payment data, but being capable of being treated as actual payment data by the data network interface system.

2. The method of claim 1, wherein providing the substitute payment data to the data network interface system prevents the captured payment data from being stored in an electronic data memory device contained within the data source system at a merchant location where the captured payment data is captured.

3. The method of claim 1, wherein capturing the payment data further comprises preventing the captured payment data from being provided to data network interface system by the data source system by storing the captured payment data in a location that is remote from the data source system and accessible over a network.

4. The method of claim 1, further comprising receiving the captured payment data from the data source system at a merchant location and generating the substitute payment data and a unique encrypted identifier.

5. The method of claim 1, wherein the substitute payment data comprises a unique encrypted identifier that excludes the confidential information.

6. The method of claim 5 further comprising associating the unique encrypted identifier with the payment data to enable the data network interface system to transmit multiple authorization messages using the substitute payment data that includes the unique encrypted identifier in place of the card data.

7. The method of claim 1 wherein generating the substitute payment data further comprises generating the substitute payment data that includes a unique encrypted identifier based, at least in part, on the payment data.

8. The method of claim 1 further comprising encrypting the substitute payment data and a unique identifier that was previously encrypted.

9. The method of claim 1 further comprising generating unique substitute payment data using one or more integrated circuits.

10. A method of generating payment data, the method comprising:
    capturing payment data associated with a payment card using a processor;
    the payment data comprising account data; and
    performing a substitute payment data generation process with the processor on the payment data to obtain substitute payment data, said performing comprising:
    generating, using one or more integrated circuits, the substitute payment data remote from the data source system as a function of the payment data associated with the payment card and confidential data by:
    obtaining a unique encrypted identifier that excludes the payment data,
    replacing at least a first portion of the account data with the unique encrypted identifier; and
    preserving at least a second portion of the account data, wherein preserving the second portion of the account data enables a system to process the substitute payment data using one or more integrated circuits as if it were payment data.

11. The method of claim 10, wherein obtaining the unique encrypted identifier that excludes the payment data comprises generating the unique encrypted identifier that excludes the payment data.

12. The method of claim 10, wherein the unique encrypted identifier that excludes the payment data is generated in response to random data.

13. The method of claim 10, wherein performing the substitute payment data generation process further comprises preserving at least a third portion of the account data using one or more integrated circuits.

14. The method of claim 13, wherein the first portion of the account data comprises a portion of the account data within the second portion of the account data and the third portion of the account data.

15. A method for generating payment data comprising:
    capturing payment data associated with a payment card using a processor;
    the payment data comprising account data;
    performing format preserving encryption on the payment data using the processor to obtain substitute payment data, said performing comprising:

generating, using one or more integrated circuits, the substitute payment data remote from the data source system as a function of the payment data associated with the payment card and confidential data by:

obtaining a unique encrypted identifier that is unique from any other encrypted identifier at the processor and that excludes the payment data;

replacing at least a first portion of the account data with the unique encrypted identifier that excludes the payment data; and preserving at least a second portion of the account data, wherein preserving the second portion of the account data enables a system to process the substitute payment data as if it were payment data.

16. The method of claim 15, wherein obtaining the unique encrypted identifier that excludes the payment data comprises generating the unique encrypted identifier that excludes the payment data.

17. The method of claim 15, wherein the unique encrypted identifier that excludes the payment data is generated using one or more integrated circuits.

18. The method of claim 15, wherein performing the substitute payment data generation process further comprises preserving at least a third portion of the account data as a portion of the substitute payment data using one or more integrated circuits.

19. The method of claim 18, wherein the first portion of the account data comprises a portion of the account data within the second portion of the account data and the third portion of the account data that is extracted using one or more integrated circuits.

\* \* \* \* \*

UNITED STATES PATENT AND TRADEMARK OFFICE
CERTIFICATE OF CORRECTION

PATENT NO.       : 9,589,257 B2
APPLICATION NO.  : 14/276916
DATED            : March 7, 2017
INVENTOR(S)      : Stephanie Bauer Marshall et al.

Page 1 of 1

It is certified that error appears in the above-identified patent and that said Letters Patent is hereby corrected as shown below:

On the Title Page

1. Delete item "(60)" and insert item -- (62) --, therefor.

In the Claims

2. In Column 8, Lines 34-35, in Claim 10, delete "the data source system" and insert -- a data source system --, therefor.

3. In Column 8, Line 38, in Claim 10, delete "data," and insert -- data; --, therefor.

4. In Column 9, Lines 2-3, in Claim 15, delete "the data source system" and insert -- a data source system --, therefor.

Signed and Sealed this
Thirtieth Day of May, 2017

Michelle K. Lee
*Director of the United States Patent and Trademark Office*